(12) United States Patent
Ozkan

(10) Patent No.: US 9,454,746 B2
(45) Date of Patent: *Sep. 27, 2016

(54) ASSET MANAGEMENT SERVICE FOR DISTRIBUTED COMPUTING ENVIRONMENTS

(71) Applicant: AT&T Intellectual Property I, L.P., Atlanta, GA (US)

(72) Inventor: Mehmet Ozkan, Allen, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/969,460

(22) Filed: Dec. 15, 2015

(65) Prior Publication Data

US 2016/0104104 A1  Apr. 14, 2016

Related U.S. Application Data

(63) Continuation of application No. 13/677,867, filed on Nov. 15, 2012, now Pat. No. 9,218,586.

(51) Int. Cl.
| | |
|---|---|
| *G06F 19/00* | (2011.01) |
| *G06Q 30/00* | (2012.01) |
| *G06Q 90/00* | (2006.01) |
| *G06Q 10/08* | (2012.01) |
| *G06F 3/0482* | (2013.01) |
| *H04W 4/02* | (2009.01) |

(52) U.S. Cl.
CPC ........... *G06Q 10/087* (2013.01); *G06F 3/0482* (2013.01); *H04W 4/02* (2013.01)

(58) Field of Classification Search
USPC ........................................ 235/375, 385, 383
See application file for complete search history.

(56) References Cited

U.S. PATENT DOCUMENTS

| | | | |
|---|---|---|---|
| 5,151,684 A | 9/1992 | Johnsen | |
| 6,941,278 B2 | 9/2005 | Soga et al. | |
| 7,292,159 B2 * | 11/2007 | Culpepper | G08B 21/0269 340/539.13 |
| 2003/0120416 A1 | 6/2003 | Beggs et al. | |
| 2003/0120677 A1 | 6/2003 | Vernon | |
| 2004/0215544 A1 | 10/2004 | Formale et al. | |
| 2005/0076034 A1 | 4/2005 | Addonisio et al. | |
| 2006/0111868 A1 | 5/2006 | Beshears et al. | |

(Continued)

OTHER PUBLICATIONS

EZasset for Business—How it works <http://www.ezasset.com/how-it-works/> Copyright 2012 [retrieved on Nov. 15, 2012].

(Continued)

*Primary Examiner* — Tuyen K Vo
(74) *Attorney, Agent, or Firm* — Hartman & Citrin LLC

(57) ABSTRACT

Concepts and technologies are disclosed herein for an asset management service. The asset management service can receive asset record creation requests and can store asset records at an asset data repository. The asset records can identify assets and associated information such as, for example, asset identifiers, personnel, organizations, users, geographic locations, time and date information, status information, or the like. A user device can execute an asset management application to generate asset tags including the asset identifiers and to scan existing asset tags. When asset tags are scanned, the user device also can capture device and/or user information that can be used to set a status or provide available status choices. Status updates can be provided to the asset management service for updating of the asset records.

20 Claims, 10 Drawing Sheets

(56) References Cited

U.S. PATENT DOCUMENTS

| | | | | |
|---|---|---|---|---|
| 2007/0124077 | A1* | 5/2007 | Hedlund | G06Q 10/087 |
| | | | | 701/300 |
| 2008/0097731 | A1* | 4/2008 | Lanes | G06Q 10/087 |
| | | | | 703/2 |
| 2008/0134307 | A1 | 6/2008 | Ashkenazi et al. | |
| 2008/0203166 | A1 | 8/2008 | Skaaksrud et al. | |
| 2009/0281933 | A1 | 11/2009 | Nonaka | |
| 2010/0194604 | A1 | 8/2010 | Ehrman et al. | |
| 2010/0225472 | A1 | 9/2010 | Culpepper et al. | |
| 2010/0305992 | A1 | 12/2010 | Michalzuk et al. | |
| 2011/0140884 | A1 | 6/2011 | Santiago et al. | |
| 2011/0202429 | A1 | 8/2011 | Graff et al. | |
| 2011/0315765 | A1 | 12/2011 | Schantz et al. | |
| 2012/0033850 | A1* | 2/2012 | Owens | G06Q 10/08 |
| | | | | 382/100 |
| 2013/0173430 | A1* | 7/2013 | Benjamin | G06Q 30/0627 |
| | | | | 705/26.63 |
| 2014/0003727 | A1* | 1/2014 | Lortz | G06Q 30/0633 |
| | | | | 382/218 |

OTHER PUBLICATIONS

MyAssetsOnline.com <http://myassetsonline.com> [retrieved on Nov. 15, 2012].

Know Your Stuff—Home Inventory <https://www.knowyourstuff.org/iii/login.html> [retrieved on Nov. 15, 2012].

Nizani, Tal, "QR Codes and IT Asset Management," <http://www.samanage.com/blog/2011/02/qr-codes-and-it-asset-management/> Feb. 7, 2011.

Pardue, Forrest and Tyler, Chris, "Smartphones & QR Codes are Changing Physical Asset Management," <http://reliabilityweb.com/index.php/articles/smartphones_QR_codes_changing_phys_asset_mgmt> Copyright 2012 [retrieved on Nov. 15, 2012].

Wilkinson, Paul, "ICON Considering QR Codes for Asset Management," <http://extranetevolution.com/2012/01/icon-considering-qr-codes-for-asset-management/> Jan. 19, 2012.

EZOfficeInventory, Track assets and their assignments to employees <http://www.ezofficeinventory.com> Copyright 2011-2012 [retrieved on Nov. 15, 2012].

Colley, Ryan, "Clever ways for IT to use QR bar codes" <http://itisrad.com/2011/07/clever-ways-for-it-to-use-qr-bar-codes/> Jul. 11, 2011.

U.S. Office Action dated May 20, 2014 in U.S. Appl. No. 13/677,867.

U.S. Office Action dated Oct. 10, 2014 in U.S. Appl. No. 13/677,867.

U.S. Office Action dated Mar. 3, 2015 in U.S. Appl. No. 13/677,867.

U.S. Notice of Allowance dated Jul. 30, 2015 in U.S. Appl. No. 13/677,867.

* cited by examiner

ASSET MANAGEMENT SERVICE FOR DISTRIBUTED COMPUTING ENVIRONMENTS

CROSS-REFERENCE TO RELATED APPLICATIONS

This application is a continuation of and claims priority to U.S. patent application Ser. No. 13/677,867, entitled "Asset Management Service for Distributed Computing Environments," filed Nov. 15, 2012, now U.S. Pat. No. 9,218,586, which is incorporated herein by reference in its entirety.

BACKGROUND

This application relates generally to asset and object management and tracking. More specifically, the disclosure provided herein relates to an asset management service for distributed computing environments.

Managing business or personal assets can be expensive. For businesses, asset management can be an expensive and resource-consuming part of the business. Some companies may create or purchase expensive asset control systems. These systems may track assets by serial numbers, identification numbers, and/or other identifiers. These and other information associated with the assets may be stored in a database or other data files.

In some instances, asset management systems may use custom labels. The custom labels may include, for example, bar code labels, UPC labels, serial number labels, or the like. The labels also can include radio frequency identification ("RFID") tags or other devices that may be affixed to the assets. The labels can include information identifying the asset. Thus, identifying information on the labels may be manually read or scanned at various times for a number of reasons.

Some equipment for reading bar codes, or the like, may be expensive, bulky, and/or may pose health or environmental hazards. Thus, some businesses continue to employ manual processes for managing assets. Manually reading or otherwise managing asset information, as well as entering and/or tracking the asset information, may be cost prohibitive in terms of manual labor, opportunity costs, or the like. Furthermore, manual processes may be prone to human error, fraud, and/or may be time consuming. As such, these and other approaches for managing assets may be of little to no use for many business and/or individuals.

Similarly, enabling asset management and tracking across geographically distributed locations can be challenging. For example, some business may operate across multiple environments, states, countries, and/or even continents that may or may not have network or power infrastructure suitable for enabling asset management and/or tracking. In particular, providing a distributed information technology ("IT") solution for such distributed environments may be expensive, may require international network links, and/or otherwise may be expensive in terms of resources.

SUMMARY

The present disclosure is directed to an asset and/or other object management and tracking service ("asset management service"). The asset management service can be operated in a cloud computing or other distributed computing environment. An asset management service can be executed on a computing device and/or can be executed across a distributed computing platform as a service. In some embodiments, the asset management service can be executed as an application by an asset management engine. The asset management service can be called via a number of application programming interfaces ("APIs") exposed by the asset management engine and/or may be interacted with via an asset management application executing on a user device such as a computer, a smart phone, or the like. The APIs of the asset management service also can enable the asset management service to communicate with other systems such as, for example, geographic information systems ("GIS"); enterprise resource planning ("ERP") software, systems, and/or applications; logistics and/or warehousing systems; other systems; or the like. These and/or other systems can be embedded in various systems and/or in the asset management service as modules. As such, some example embodiments of the concepts and technologies disclosed herein can enable a user or other entity to select an object in an ERP software application and track transactions and/or other activities associated with the object. It should be understood that this embodiment is illustrative, and should not be construed as being limiting in any way.

The user device, via execution of the asset management application, can be used to create or request creation of asset records ("records"). The records can be stored at an asset data repository that can be associated with the asset management service. In particular, a user or other entity can identify new assets; assign or generate an asset identifier for the asset; specify personnel, organizations, and/or users who can modify status information of the asset; provide location and/or date information; provide available status updates for the asset; and/or otherwise define the asset and/or the associated asset record. The user device also can be configured to print asset tags, labels, or other indicia that can be affixed to the assets. Data from the asset tags also can be scanned or otherwise captured to allow updating of the records.

The user device also can include an identifier capture device for capturing an asset identifier from an asset tag or other indicia. In addition to capturing the asset identifier, the user device also can capture device and/or user information. The device and/or user information can include, but is not limited to, geographic location information, user information, device identification information, time and date information, or the like. These and other data can be provided to the asset management service, and the asset management service can provide a list of available status updates associated with the asset. A user or other entity may select, modify, or update a status associated with the asset and can provide the status to the asset management service for updating of the associated record. In some embodiments, the asset management service can be configured to update the status without presenting a list of events and/or receiving data indicating a selection of a status since a scan of the asset tag may provide information used to update the associated record.

Thus, embodiments of the concepts and technologies disclosed herein can be used to simplify and/or reduce the costs of asset management. As used herein, the term "asset" can refer to a tangible good such as a product or a capital asset. The term "asset" also can be used to refer to a "service" that is sold, managed, or otherwise tracked by an individual or business. Thus, for example, a dry cleaner may track employee interactions with an article of clothing by affixing an asset tag to the article of clothing and instructing employees to scan the asset tag when interactions with the article of clothing occur. Because other types of assets are possible and are contemplated, it should be understood that this embodiment is illustrative, and should not be construed as being limiting in any way.

According to one aspect of the concepts and technologies disclosed herein, a method is disclosed. The method can include obtaining, at a user device executing an asset management application, an asset identifier including information identifying an asset, capturing device data, the device data including data indicating a geographic location associated with the user device, capturing event data, the event data identifying a status of the asset, and transmitting the asset identifier, the device data, and the event data to an asset management engine.

In some embodiments, the asset identifier can be obtained from image information associated with an asset tag attached to the asset. The asset tag also can be generated at the user device. In some embodiments, the generating the asset tag can include generating the asset identifier, obtaining asset information, and requesting printing of the asset tag. Generating the asset tag also can include transmitting the asset identifier and asset information to an asset management service for creation of an asset record associated with the asset. In some embodiments, the asset tag can include a two-dimensional barcode. Obtaining the asset identifier can include presenting a user interface for scanning the asset tag to extract the asset identifier from the two-dimensional barcode, recognizing the two-dimensional barcode, capturing image information associated with the two-dimensional barcode, and extracting the asset identifier from the image information. In some embodiments, the device data can include a device identifier associated with the user device. The device data also can include user credentials associated with a user of the user device. In some embodiments, capturing the event data can include providing the asset identifier to the asset management engine, receiving a list of events associated with the asset identifier, and selecting the status from the list of events.

According to another aspect of the concepts and technologies disclosed herein, a device is disclosed. The device can include a processor and a memory that stores computer-executable instructions. When the instructions are executed by the processor, the processor can perform operations that include obtaining an asset identifier including information identifying an asset, capturing device data that includes data identifying a geographic location of the device, generating event data identifying a status of the asset, and transmitting the asset identifier, the device data, and the event data to an asset management service.

In some embodiments, the device also can include an imaging system that captures an image of an asset tag that includes indicia representing the asset identifier, and the image system can extract the asset identifier from the image. The device also can include a cellular transceiver that communicates with the asset management service, and the asset management service can include an application executing on a server computer. The device also can include a global positioning system device that determines the geographic location. In some embodiments, capturing the device data can include capturing a unique identifier that identifies the device and user data including a credential associated with a user of the device, and the event data can be selected from a list of events obtained from the asset management service. In some embodiments, the device also can provide the asset identifier to the asset management engine to generate a list of events associated with the asset identifier. The asset management engine can generate the list by searching two or more asset records stored at an asset data repository for asset records associated with the asset identifier, and can identify the events based upon the asset records. The device also can receive a list of events from the asset management service, and select the status from the list of events. In some embodiments, the device further includes a printer that prints an asset tag including indicia representing the asset identifier.

According to yet another aspect, a computer storage medium is disclosed. The computer storage medium can have computer-executable instructions stored thereon that, when executed by a processor, cause the processor to perform operations. The operations can include obtaining an asset identifier that identifies an asset with device data including data indicating a geographic location associated with the asset, and event data identifying a status of the asset, generating a list of events associated with the asset identifier, the list of events being based, at least partially, upon the asset identifier, the geographic location, and the status, and providing the list of events to a device for selecting a status of the asset.

In some embodiments, the computer storage medium can further include computer executable instructions that, when executed by the processor, cause the processor to perform operations for searching for asset records associated with the asset identifier, identifying events for an asset associated with the asset identifier, the events being based upon the asset records, generating the list of events based upon the asset records, and receiving a selection of the status at the device. The computer storage medium can further include computer executable instructions that, when executed by the processor, cause the processor to present a user interface via which the asset tag can be scanned to extract the asset identifier from an asset tag attached to the asset. The user interface can include a user interface control for scanning the asset tag. In some embodiments, the computer storage medium can further include computer executable instructions that, when executed by the processor, cause the processor to present a further user interface via which the status of the asset can be indicated. The further user interface can include user interface controls for editing the status of the asset, verifying the geographic location, and selecting personnel associated with the status.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
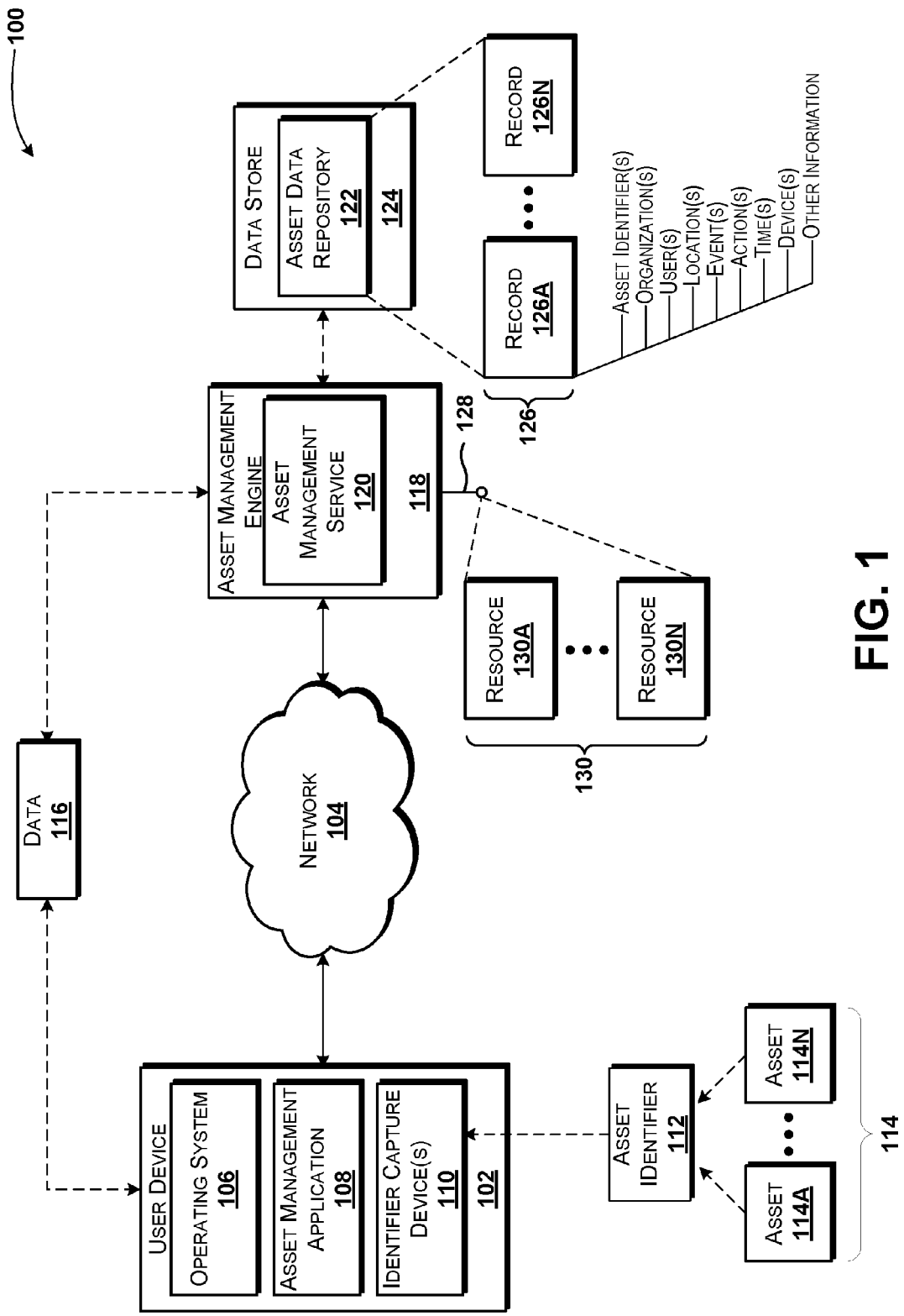
FIG. 1 is a system diagram illustrating an illustrative operating environment for the various embodiments disclosed herein.

The following detailed description is directed to an asset management service. The asset management service can be executed in a cloud computing environment, other distributed computing environments, as well as on local or isolated computing environments. The asset management service can be executed on a computing device such as a server computer and/or can be executed across a distributed computing platform as a cloud service. The asset management service can be called via a number of APIs exposed by an asset management engine that executes the asset management service. The asset management service also may be interacted with via an asset management application executing on a user device such as a computer, a smart phone, or other computing devices.

The APIs of the asset management service also can enable the asset management service to communicate with other systems such as, for example, GIS software, systems, and/or applications; ERP software, systems, and/or applications; logistics and/or warehousing software, systems, and/or applications; other software, systems, and/or applications; combinations thereof; or the like. These and/or other software, systems, and/or applications can also be embedded in other systems and/or in the asset management service as modules. As such, some example embodiments of the concepts and technologies disclosed herein can include an asset management service that also includes GIS, ERP, logistics, warehousing, and/or other capabilities described herein. It should be understood that this embodiment is illustrative, and should not be construed as being limiting in any way.

The user device can execute the asset management application to create or request creation of asset records ("records") that can be stored at an asset data repository. The asset data repository can be located at the asset management engine and/or can be a data storage device accessible by the asset management service. Via the asset management application, a user or other entity can identify assets; assign or generate an asset identifier for the asset; specify personnel, organizations, and/or users who can modify status information of the asset; provide geographic location or other location information; provide date and/or time information; provide current, anticipated, and/or available statuses for the asset; and/or otherwise define the asset and/or the associated record. The user device also can be configured to print asset tags, labels, or other indicia that can be affixed to the assets and scanned or captured to allow updating of the records.

The user device also can include an identifier capture device. The identifier capture device can include an image system of the user device such as, for example, a camera or the like. The identifier capture device also can include a wireless transceiver for wirelessly capturing the asset identifier from an asset tag or the like. In addition to capturing the asset identifier, the user device also can capture device and/or user information. The device and/or user information can include, but is not limited to, geographic location information; user information; device identification information; time and/or date information; user credentials; device identifiers; passwords, tokens, or other authentication information; or the like. These and other data can be provided to the asset management service and the asset management service can provide a list of available status updates associated with the asset. A user or other entity may select or input a status associated with the asset and provide the updated status to the asset management service for updating of the associated record.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for an asset management service for distributed computing environments will be described, according to an illustrative embodiment. The operating environment 100 shown in FIG. 1 includes a user device 102 operating in communication with and/or as part of a communications network ("network") 104. According to various embodiments, the functionality of the user device 102 may be provided by one or more cellular phones, mobile telephones, smartphones, server computers, desktop computers, tablet computers, laptop computers, set-top boxes, other computing systems, and the like. For purposes of describing the concepts and technologies disclosed herein, the user device 102 is described as a mobile telephone or a smartphone. It should be understood that this embodiment is illustrative, and should not be construed as being limiting in any way.

The user device 102 can execute an operating system 106 and one or more application programs such as, for example, an asset management application 108. The operating system 106 is a computer program for controlling the operation of the user device 102. The application programs can include various executable programs configured to execute on top of the operating system 106 to provide various functions and/or functionality. The asset management application 108 is an executable program configured to execute on top of the operating system 106 to provide various asset management functionality as described herein. In some embodiments, one or more of the application programs can be configured to provide the functionality of the asset management application 108 described herein. As such, it should be understood that the asset management application 108 can be included in other application programs and/or that other application programs can be included in the asset management application 108. It therefore can be understood that the application programs and/or the asset management application 108 can include and/or can provide functionality associated with one or more mapping/navigation applications, web browsers, office productivity software, media playback applications, voice and/or data communication applications, diagnostic applications, other applications, combinations thereof, or the like.

According to various embodiments of the concepts and technologies described herein, the asset management application 108 can be executed as a stand-alone application at the user device 102. The asset management application 108 also can be executed remotely from the user device 102 and can be accessed using a Web application or other application executed at the user device 102. According to various embodiments, the asset management application 108 can be configured to generate, obtain, modify, and/or save various types of asset information, as will be explained in more detail below.

In particular, the user device 102 can include one or more identifier capture devices 110. The identifier capture devices 110 can be accessed and/or controlled by the user device 102 to capture, scan, and/or otherwise obtain an asset identifier 112 associated with one or more assets 114A-N (hereinafter collectively and/or generically referred to as "assets 114"). The asset identifier 112 can include various types of identifiers for identifying the assets 114. According to various embodiments, the asset identifier 112 can include a globally unique identifier ("GUID") that can uniquely identify a particular asset 114, an alphanumeric string that identifies a particular asset 114, other identifying information associated with one or more assets 114, or the like. Thus, the asset identifier 112 can include a serial number, a model number, a unique identifier, and/or other types of identifying information. To more clearly describe various embodiments of the concepts and technologies described herein, the asset identifier 112 is described herein as a unique identifier that can be assigned to an asset 114. Because other embodiments are possible and are contemplated, it should be understood that this embodiment is illustrative, and should not be construed as being limiting in any way.

In some embodiments, the user device 102 can determine or obtain the asset identifier 112 associated with an asset 114 using various optical scanning technologies. For example, the identifier capture device 110 can include a camera or other imaging devices of the user device 102 and the asset identifier 112 can be recognized, extracted, and/or captured by scanning visual indicia affixed to the asset 114 by way of a tag, label, or the like. According to some embodiments described herein, the visual indicia can include a bar code or UPC symbol. According to some other embodiments, the visual indicia can include a two-dimensional ("2D") barcode such as a quick response code ("QR code"). According to some other embodiments, the visual indicia can include other types of 2D barcodes such as, for example, a MAXI-CODE, a DATA MATRIX, an EZCODE, an AZTEC code, a CODABLOCK barcode, and/or other matrix barcodes; various multicolor codes such as a HIGH CAPACITY COLOR BARCODE and/or a HUECODE; combinations thereof; or the like. Because the indicia can include almost any type of information for representing the asset identifier 112, it should be understood that these embodiments are illustrative, and should not be construed as being limiting in any way.

In some other embodiments, the user device 102 can determine or obtain the asset identifier 112 associated with the asset 114 using various wireless communication technologies. For example, the asset 114 can include a tag or label with embedded wireless communications devices such as radio frequency identification ("RFID") devices, near field communications ("NFC") devices, and/or the like. As such, the identifier capture devices 110 can include, in some embodiments, radio transmitters, infrared transmitters, combinations thereof, or the like. For purposes of describing the concepts and technologies described herein, the identifier capture device 110 is described herein as a camera or other imaging device and the indicia are described herein as tags or labels that include a QR code that can be scanned or captured by the identifier capture device 110 to recognize the asset identifier 112. In light of the above examples of indicia and identifier capture devices 110, it should be understood that this embodiment is illustrative, and should not be construed as being limiting in any way.

The asset management application 108 can be configured to access and/or activate the identifier capture device 110 to capture an asset identifier 112 associated with an asset 114. The asset management application 108 also can be configured to capture various information associated with the user device 102 and/or a user or other entity operating the user device 102 when the asset identifier 112 is captured or scanned. In particular, the user device 102 can include various location devices and/or software for determining a geographic location of the user device 102. As such, the asset management application 108 can be configured to obtain geographic location information from these and/or other devices when the asset identifier 112 is captured or scanned.

The asset management application 108 also can be configured to capture time and/or date information from the user device 102 and/or from one or more network devices in communication with the user device 102 via the network 104. As such, the asset management application 108 can be configured to capture time and date information when the asset identifier 112 is captured or scanned. Other information also can be captured by the asset management application 108 such as, for example, event data that can include location information; time information; asset information; type of activity information; user credentials; network connection information; device orientation information; and/or other sensor information obtained from various sensors of the user device 102 such as, for example, ambient temperature, pressure, altitude, speed, and/or other conditions; combinations thereof; or the like. The various data that can be captured by the asset management application 108 are described in additional detail below, particularly with reference to FIG. 3.

In addition to capturing these and other types of information with the capturing of the asset identifier 112, the asset management application 108 also can package and/or bundle the information and communicate the information to other devices, systems, or software as data 116 for additional operations and/or functionality. As shown in FIG. 1, the data 116 can be exchanged by the user device 102 with an asset management engine 118 and/or an asset management service 120 executed by or at the asset management engine 118. The asset management engine 118 can be configured, via execution of the asset management service 120, to capture the data 116, to store the data 116 and/or portions of the data 116 in an asset data repository 122, and/or to respond with information relating to the asset 114 for various functions at the user device 102, as will be explained in more detail below.

According to various embodiments, the asset data repository 122 can be maintained as a database or other data structure at a data store 124. The functionality of the data store 124 can be provided by one or more databases, server computers, desktop computers, mobile telephones, laptop computers, other computing systems, or the like. The asset data repository 122 can include data representing a number of asset records ("records") 126A-N (hereinafter collectively and/or generically referred to as "records 126"). The records 126 can be created, modified, and/or stored by the asset management service 120 based upon the data 116 exchanged with the user device 102 and/or based upon other information. In some embodiments, the asset management service 120 can maintain information associated with assets 114 as the records 126, and can obtain various types and/or categories of information to the user device 102 in response to receiving the asset identifier 112 from the user device 102. These embodiments are illustrated and described in more detail below.

As shown in FIG. 1, the records 126 can include information identifying one or more asset identifiers 112, one or more organizations, one or more users, one or more locations (including but not limited to one or more geographic locations and/or one or more network locations), one or more events, one or more actions, one or more dates or times ("times"), one or more devices, and/or other information. As such, the records 126 can identify any number of assets 114, users, actions, events, and/or other information for any number of tenants, organizations, and/or users. In response to receiving information identifying a particular asset identifier 112, the asset management service 120 can identify records 126 relating to the asset identifier 112, provide available information to the user device 102, receive and store status updates, and/or take other actions as illustrated and described in more detail below. These and other functions of the asset management service 120 will be more clearly understood with reference to FIGS. 2-5C below.

As shown in FIG. 1, the asset management service 120 and/or the asset management engine 118 can be configured to expose one or more application programming interfaces ("APIs") 128. The APIs 128 can be exposed to allow the asset management service 120 to be accessed by and/or to allow the asset management service 120 to access various resources 130A-N (hereinafter collectively and/or generically referred to as "resources 130"). The resources 130 can include various software, systems, and/or applications such as, for example, GIS software, systems, and/or applications; ERP software, systems, and/or applications; logistics and/or warehousing software, systems, and/or applications; other software, systems, and/or applications; combinations thereof; or the like. These and/or other embodiments of the resources 130 also can be embedded in the asset management service 120 as modules. As such, some example embodiments of the asset management service 120 disclosed herein can include GIS, ERP, logistics, warehousing, and/or other capabilities. It should be understood that this embodiment is illustrative, and should not be construed as being limiting in any way.

Briefly, the user device 102 can be configured generate or assign an asset identifier 112 to a particular asset 114. The asset identifier 112 can be created at the user device 102 in response to user input or can be received at the user device 102 from other devices or services such as the asset management service 120. In some embodiments, the user device 102 can be configured to generate asset tags, labels, or other indicia that can be printed in tangible form by printers or other devices in communication with the user device 102 via wireless and/or wired connections. Thus, a user or other entity associated with the user device 102 can activate the asset management application 108 to generate and/or print tags, labels, or the like for representing the asset identifier 112. The user or other entity can affix the tags, labels, or the like to the assets 114.

In some embodiments, the asset tags, labels, and/or other indicia representing the asset identifiers 112 can be produced in bulk by a user or other entity. For example, in some embodiments the asset management service 120 can include a web interface. A user or other entity can access the web interface to generate the asset identifiers 112 in bulk. Thus, users or other entities can order asset tags, labels, or the like in bulk, if desired. It should be understood that this embodiment is illustrative, and should not be construed as being limiting in any way.

The user device 102 also can capture asset identifiers 112 from assets 114 and update status information associated with the asset 114. Thus, embodiments of the concepts and technologies described herein can provide a cloud-based logistics platform for tracking movement and/or other actions or statuses associated with the assets 114. In particular, the user device 102 can capture an asset identifier 112 and transmit data 116 representing the asset identifier 112 to an asset management engine 118 in communication with the user device 102. As explained above, various device, user, and/or environmental conditions can also be captured by the user device 102 and shared with the asset management engine 118 as or with the data 116. In addition to geographic location information, time information, date information, sensor information, and the like, the user device 102 also can capture user identity and/or authentication information. The user and/or device information can be used to authenticate the user device 102 and/or a user associated with the user device 102 with the asset management engine 118, for storage at the asset data repository 122, to determine and/or obtain actions or events available for a particular asset 114 at a particular time and/or location, and/or for other purposes as described in more detail herein.

Additionally, the user and/or device information can be used to determine what functionality of the asset management engine 118 is available in a particular interaction. In some embodiments, the user and/or device information also can be used by the asset management engine 118 to determine events or actions available for an asset 114 associated with an asset identifier 112 scanned or captured by the user device 102 based on a user, a device identity, authentication information, credentials, or the like. In some embodiments, the user and/or device information includes device-based authentication information such as, for example, an international mobile subscriber identity ("IMSI"), an international mobile equipment identity ("IMEI"), a media access control ("MAC") address, a unique device identifier ("UDID"), a serial number, a phone number, an email address, a user name, other device identifiers, combinations thereof or the like. In some other embodiments, the user and/or device information includes information generated by the asset management application 108 such as tokens, user IDs, passwords, and/or other software/application authentication information. In some other embodiments, the user and/or device information includes a combination of device identifiers and/or user identification information. Thus, the asset management engine 118 can be configured to determine a user, organization, and/or device associated with a particular asset 114 and/or asset event.

The asset management engine 118 can search or request a search of the asset data repository 122 to identify records 126 associated with the asset identifier 112. Based upon the records 126 and the data 116 submitted to the asset management engine 118, the asset management engine 118 can identify one or more events or actions. The event or actions can include, for example, creation of an asset, beginning of manufacturing, packaging of the asset 114, shipping of the asset 114, delivery of the asset 114, movement of the asset 114, other events or actions, or the like. These events or actions can be identified by the asset management engine 118 as available or possible statuses based upon the data 116 and the records 126. Thus, in response to receiving the data 116 from the user device 102, the asset management engine 118 can provide one or more possible statuses to the user device 102. In some embodiments, the statuses, events, or actions can be provided as a list of events or actions. It should be understood that this embodiment is illustrative, and should not be construed as being limiting in any way.

The user device 102 can present the statuses or events at the user device 102 and obtain a selection of one or more of the statuses or events. The user device 102 can again provide the data 116 to the asset management engine 118, wherein the data 116 can identify the status selected at the user device 102. The asset management engine 118 can update the asset data repository 122 and/or records 126 stored therein based upon the data 116. As such, the asset management engine 118 can maintain information stored at the asset data repository 122 that indicates a current status of any number of assets 114. These and other aspects of the concepts and technologies described herein for providing an asset management service for distributed computing environments are described in more detail below.

FIG. 1 illustrates one user device 102, one network 104, one asset management engine 118, and data store 124. It should be understood, however, that various implementations of the operating environment 100 include multiple user device 102, multiple networks 104, multiple asset management engines 118, and/or multiple data stores 124. As such, the illustrated embodiment should be understood as being illustrative, and should not be construed as being limiting in any way.

Figure 2:
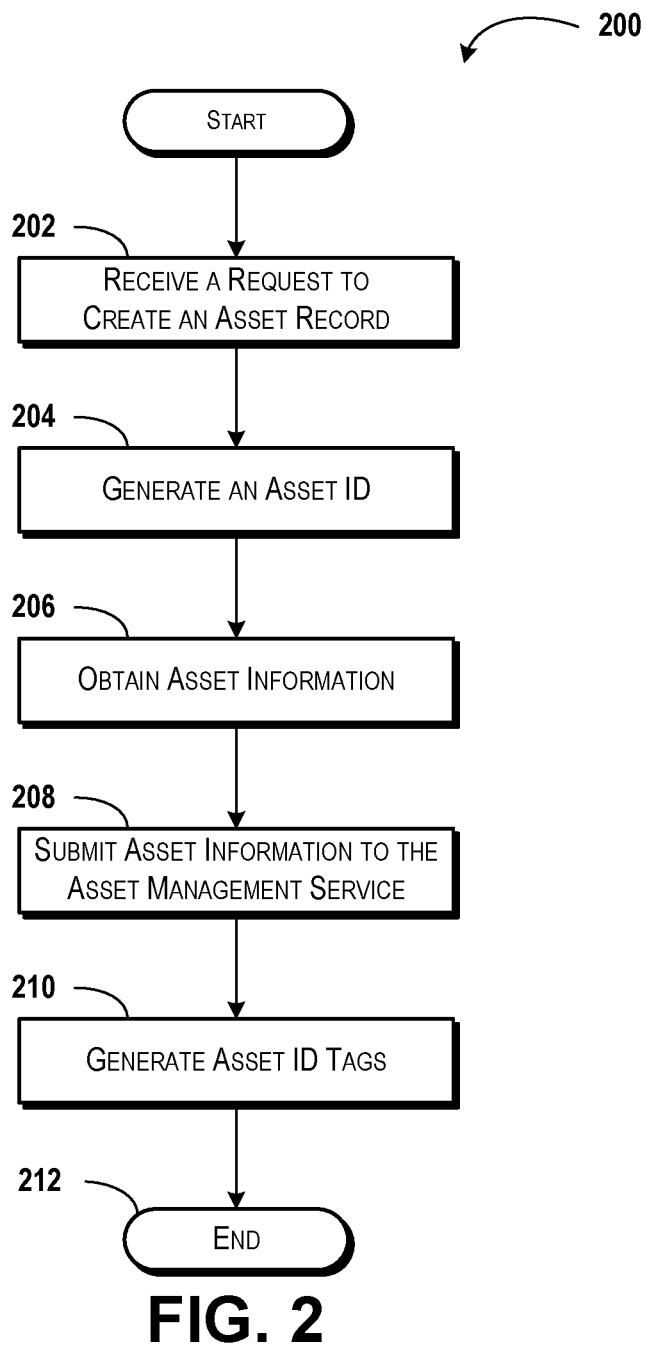
FIG. 2 is a flow diagram showing aspects of a method for creating asset information for an asset management service, according to an illustrative embodiment.

Turning now to FIG. 2, aspects of a method 200 for creating asset information for an asset management service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the asset management engine 118 to perform one or more operations and/or causing the processor to direct other components of the computing system or device to perform one or more of the operations.

For purposes of illustrating and describing the concepts of the present disclosure, the method 200 is described as being performed by the user device 102 via execution of one or more software modules such as, for example, the asset management application 108. It should be understood that additional and/or alternative devices and/or network nodes can provide the functionality described herein via execution of one or more modules, applications, and/or other software including, but not limited to, the asset management application 108. Thus, the illustrated embodiments are illustrative, and should not be viewed as being limiting in any way.

The method 200 begins at operation 202, wherein the user device 102 receives a request to create an asset record. The user device 102 can receive input for creating a new record 126 for an asset 114. For example, a user or other entity can include a manufacturing employee on an assembly line and the request received in operation 202 can correspond to the employee generating a tag, label, or other indicia for a new asset 114 that is being manufactured or assembled on the assembly line. In another example, the user or other entity can receive a good or other asset 114 and generate an asset tag or other indicia for the asset 114. In addition to generating an asset tag, label, or the like, the creation of the record 126 can allow tracking of the asset 114 during the lifetime of the asset 114 and/or during creation or assembly of the asset 114. An example user interface for creating an asset record and/or asset tags, labels, or other indicia associated with a new asset record is described an illustrated in more detail below in FIG. 5C.

From operation 202, the method 200 proceeds to operation 204, wherein the user device 102 generates an asset identifier 112. The asset identifier 112 can include almost any text, graphics, or other information for identifying an asset 114. While the description herein refers generally to assets 114 as tangible goods, it should be understood that the asset 114 also can correspond to services that are tracked by an entity or organization and as such, the asset label, tag, or other indicia of the asset identifier 112 can be printed on a receipt, bill, or other item associated with services.

In some embodiments, the asset identifier 112 generated in operation 204 can include a GUID or other unique identifier that can include various random or nonrandom alphanumeric text strings. In some other embodiments, the asset identifier 112 can include a serial number or other nonrandom text that identifies the asset 114. Because the asset identifier 112 can include almost any type or category of information, it should be understood that the above examples of the asset identifier are illustrative and should not be construed as being limiting in any way.

From operation 204, the method 200 proceeds to operation 206, wherein the user device 102 obtains asset information associated with the asset identifier 112 created in operation 204. Thus, the user device 102 can prompt a user or other entity for asset information such as, for example, a time and/or date, a current status, a location or geographic location of the asset 114, personnel who can and/or will be authorized to interact with the asset record or other record 126 associated with the asset 114, authentication or credential information, permissions, or the like. The asset information also can include information associated with a customer or target of the asset 114 such as a final destination for the asset 114, a date of completion or anticipated completion, a shipping or delivery address, an actual or anticipated cost, a goal, combinations thereof, or the like. Because almost any information can be obtained by the user device 102 in operation 204, it should be understood that these embodiments are illustrative, and should not be construed as being limiting in any way.

From operation 206, the method 200 proceeds to operation 208, wherein the user device 102 submits the asset information obtained in operation 208 to the asset management engine 118. As illustrated in FIG. 1, the user device 102 can submit the information obtained in operation 206 to the asset management engine 118 as the data 116. Thus, though not explicitly illustrated in FIG. 2, it should be understood that the user device 102 can be configured to package the asset information as the data 116 and/or to stream information to the asset management engine 118 or otherwise make the data 116 available to the asset management engine 118.

From operation 208, the method 200 proceeds to operation 210, wherein the user device 102 generates one or more asset ID tags, labels, or other indicia that include information identifying the asset identifier 112. In some embodiments, the user device 102 can be configured to send a print request to a printer to generate the asset ID tag or label. In some other embodiments, the user device 102 can be connected to a printer via a wired and/or wireless connection. Thus, operation 210 can correspond, in some embodiments, to printing or requesting printing of a label or tag that represents the asset identifier generated in operation 204. In one contemplated embodiment, the asset label or tag includes a QR code that represents the asset identifier 112. Because other indicia are contemplated and are possible, it should be understood that this embodiment is illustrative, and should not be construed as being limiting in any way. Example user interfaces that support printing or other generation of asset tags, labels, or other indicia are illustrated and described in more detail in FIGS. 5B-5C.

From operation 210, the method 200 proceeds to operation 212. The method 200 ends at operation 212. It can be appreciated that the operations of the method 200 described above can correspond to operations completed by the user device 102 when an asset 114 is delivered or received, when a service or other intangible "asset" is begun or ordered, when creation or assembly of the asset 114 begins, and/or at other times or under other circumstances.

Figure 3:
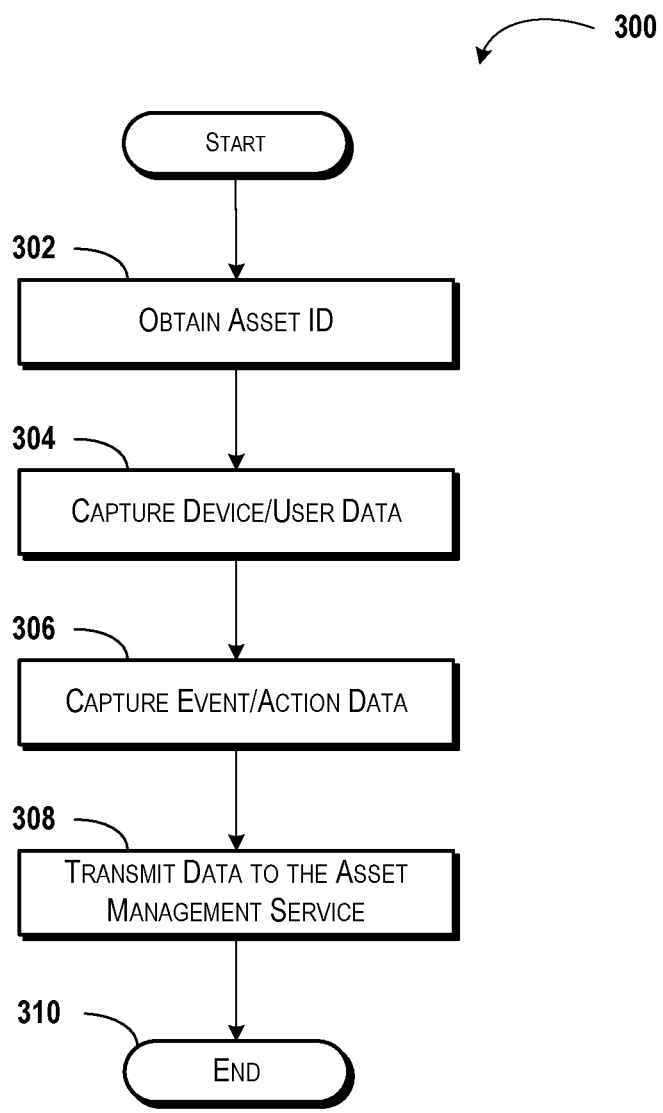
FIG. 3 is a flow diagram showing aspects of a method for generating an asset information update, according to another illustrative embodiment.

Turning now to FIG. 3, aspects of a method 300 for generating an asset information update will be described in detail, according to an illustrative embodiment. The method 300 is described as being performed by the user device 102 via execution of one or more software modules such as, for example, the asset management application 108. It should be understood that additional and/or alternative devices and/or network nodes can provide the functionality described herein via execution of one or more modules, applications, and/or other software including, but not limited to, the asset management application 108. Thus, the illustrated embodiments are illustrative, and should not be viewed as being limiting in any way.

The method 300 begins at operation 302, wherein the user device 102 obtains an asset identifier 112. According to various embodiments, operation 302 can correspond to a user scanning or otherwise capturing an asset identifier 112. In some embodiments, the asset identifier 112 can be scanned or captured from an asset tag, label, or other indicia. An example user interface for obtaining the asset identifier 112 is illustrated and described below in FIG. 5A. In some embodiments, the asset identifier 112 can be input as text by a user or other entity. In yet other embodiments, a graphic, voice command, or other type of data can be obtained in operation 302. Because almost any type of information or data can be obtained by the user device 102 in operation 302, it should be understood that these embodiments are illustrative, and should not be construed as being limiting in any way.

From operation 302, the method 300 proceeds to operation 304, wherein the user device 102 captures device and/or user data. According to various embodiments, the user device can be configured to capture various data when the asset identifier 112 is captured and/or at other times. The device/user data can include, for example, a time and/or date; a geographic location and/or other location information such as network identifiers, location within a building or other structure, or the like; sensor data or information such as temperature, light, noise levels, or the like; device identifiers such as IMEIs, IMSIs, UDIDs, serial numbers, or the like; user identifiers such as name, identification numbers, authentication information, passwords, tokens, user IDs, or the like; other information; and/or combinations thereof.

From operation 304, the method 300 proceeds to operation 306, wherein the user device 102 captures or determines event and/or action information. As will be explained in more detail below with reference to FIG. 4, the event and/or asset information can be selected from a list of events or actions. The list of events or actions can be delivered to or otherwise obtained by the user device 102 from the asset management engine 118. The events or actions can be determined and/or based upon the asset identifier 112 obtained in operation 302, as well as the device/user data obtained in operation 304. In some embodiments, the event and/or action information can be generated at the user device 102 and therefore may or may not be represented in a list of events or actions.

From operation 306, the method 300 proceeds to operation 308, wherein the user device 102 transmits data 116 to the asset management engine 118 and/or the asset management service 120. According to various embodiments, the data 116 transmitted in operation 308 can include, but is not limited to, the asset identifier 112, the device/user data, and event information captured and/or obtained in operations 302-306. As explained herein, the data 116 and/or other types of event data or other information captured in operations 302-306 can include the types of information listed above as well as location information, user information, sensor readings, device information, time information, and asset actions. The asset actions can include, but are not limited to, specific actions or events such as, for example, repaired, visited, delivered, commenced, received, in progress, pending, or the like. Because additional and/or alternative information can be submitted to the asset management service 120, it should be understood that these embodiments are illustrative, and should not be construed as being limiting in any way.

From operation 308, the method 300 proceeds to operation 310. The method 300 ends at operation 310.

Figure 4:
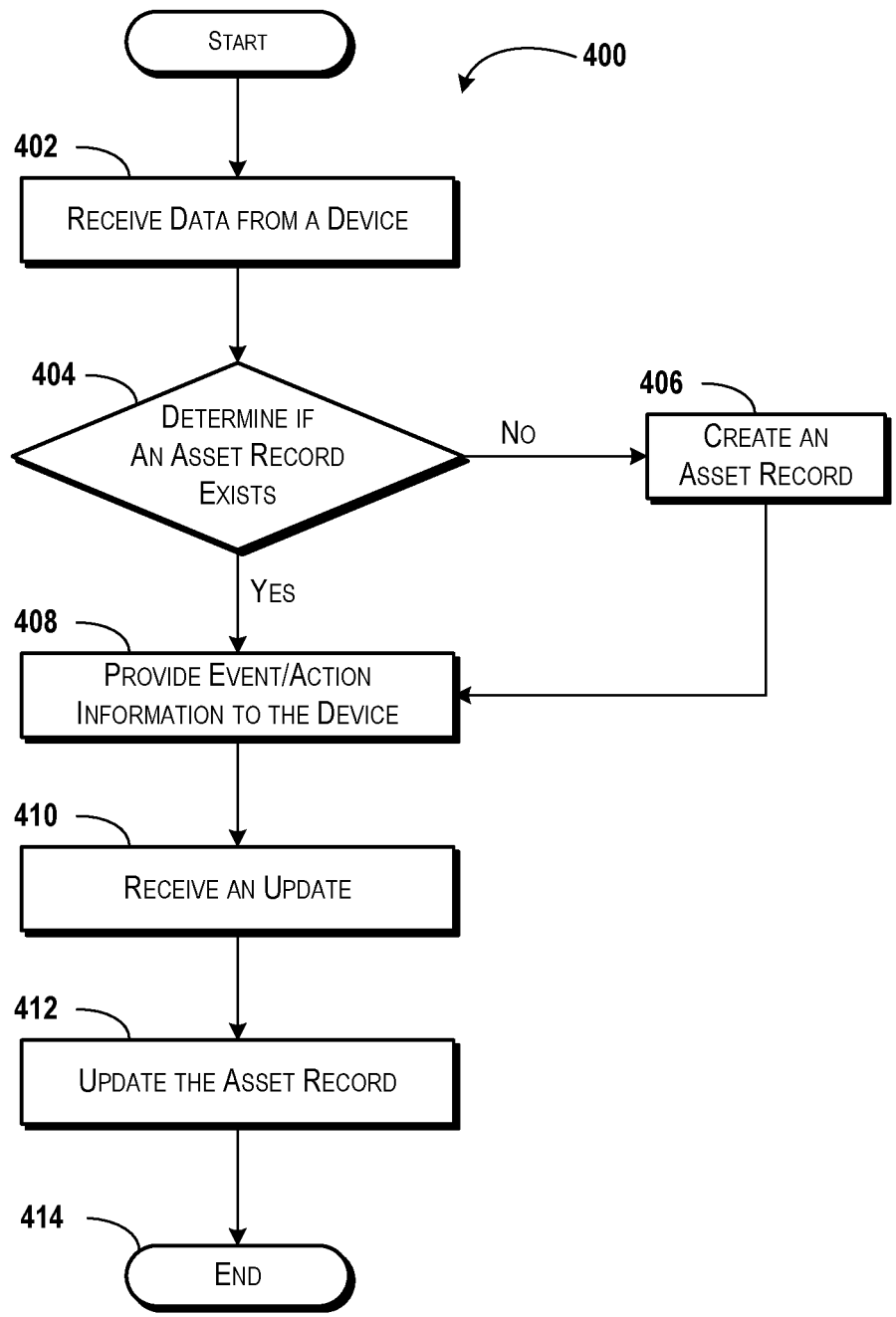
FIG. 4 is a flow diagram showing aspects of a method for updating asset information at an asset management service, according to another illustrative embodiment.

Turning now to FIG. 4, aspects of a method 400 for updating asset information at an asset management service 120 will be described in detail, according to an illustrative embodiment. For purposes of illustrating and describing the concepts of the present disclosure, the method 400 is described as being performed by the asset management engine 118 via execution of one or more software modules such as, for example, the asset management service 120. It should be understood that additional and/or alternative devices and/or network nodes can provide the functionality described herein via execution of one or more modules, applications, and/or other software including, but not limited to, the asset management service 120. Thus, the illustrated embodiments are illustrative, and should not be viewed as being limiting in any way.

The method 400 begins at operation 402, wherein the asset management engine 118 receives data 116 from a device such as the user device 102. The data 116 received in operation 402 can include, but is not limited to, data representing an asset identifier 112; a time and/or date of that the asset identifier 112 was captured or scanned; a geographic location at which the asset identifier 112 was captured or scanned; personnel associated with the scanning and/or capture of the asset identifier 112; an organization associated with the scanning and/or capture of the asset identifier 112; a device and/or device identifier associated with the user device 102; combinations thereof; or the like. As such, the data 116 received in operation 402 can be used to determine a time, date, geographic location, personnel, organization, device, or asset 114 associated with the asset identifier 112 captured at the user device 102.

From operation 402, the method 400 proceeds to operation 404, wherein the asset management engine 118 can determine if an asset record exists for the asset identifier 112 included in the data 116 received in operation 402. According to various embodiments, the asset management engine 118 can search the asset data repository 122 and/or request a search of the asset data repository 122. The search executed or requested by the asset management engine 118 can be for the purpose of identifying one or more records 126 associated with the asset identifier 112. As explained above, the asset data repository 122 can be a multitenant database or data store. As such, the asset data repository 122 can include records 126 associated with any number of assets 114, asset identifiers 112, organizations, personnel, users, or the like.

If the asset management engine 118 determines, in operation 404, that a record 126 associated with the asset identifier 112 received in operation 402 is not stored at the asset data repository 122, the method 400 proceeds to operation 406. In operation 406, the asset management engine 118 can create a new asset record, e.g., a new record 126 associated with the asset identifier 112 received in operation 402. From operation 406, or from operation 404 if the asset management engine 118 determines that a record 126 associated with the asset identifier 112 exists in the asset data repository 122, the method 400 proceeds to operation 408.

In operation 408, the asset management engine 118 provides event and/or action information to the device from which the data 116 was received in operation 402. Thus, for example, if the asset management engine 118 receives the data 116 from the user device 102 in operation 402, the asset management engine 118 can provide the determined status to the user device 102 in operation 408. It can be appreciated from the discussion of FIG. 1 that the event and/or action information can be provided to the user device 102 as the data 116 and/or that the data 116 can be displayed on one or more user interfaces. Furthermore, though not separately illustrated in FIG. 4, the asset management engine 118 can determine available event and/or action information for the asset identifier 112. According to various embodiments of the concepts and technologies described herein, the asset management engine 118 can be configured to populate a list of recognized and/or available actions and/or events based upon the asset identifier 112. The available events and/or actions can be extracted from the records 126 and/or can be known to the asset management engine 118. Illustrative events and/or actions can include, but are not limited to, order received, manufacturing begun, assembly begun, assembly completed, delivered, packaged, shipped, or the like.

From operation 408, the method 400 proceeds to operation 410, wherein the asset management engine 118 receives an update from the device. In operation 410, the asset management engine 118 can receive data indicating a selection of one or more of the events and/or actions provided to the device in operation 408. The device can transmit the data indicating the selection of the one or more events or actions or otherwise inform the asset management engine 118 regarding the selection.

From operation 410, the method 400 proceeds to operation 412, wherein the asset management engine 118 can update the asset record. As such, the asset management engine 118 can update the status associated with the record 126 created in operation 406 or identified in operation 404 to reflect the status indicated by the update received in operation 410. As such, the asset management engine 118 can update the records 126 in response to receiving the data 116 from the device in operation 402.

From operation 412, the method 400 proceeds to operation 414. The method 400 ends at operation 414.

Although not illustrated or described in FIG. 4, the asset management engine 118 also can be configured to generate a third party access web site and/or other reporting mechanisms such as emails, text messages, or the like. In particular, a customer or user of the asset management service 120 can be enabled to share asset information with customers or other interested or authorized parties. Thus, for example, if a tailor uses the asset management service 120 to track progress of an asset 114, in this case a suit, the tailor can attach an asset tag to the suit or raw materials and scan the asset tag during the process of making the suit. The tailor can provide a customer with a link to a website and/or can provide text messages to the customer. Thus, the customer can view the current status and/or other information associated with the asset management service 120.

The third party or other entity can access the asset management engine 118 and provide authentication information such as a password and username provided by the tailor or other entity. The asset management engine 118 can obtain records 126 associated with the user or customer and can format a web page or other interface for viewing the assets 114 associated with the customer or user. As such, the asset management engine 118 can provide status updates not only to a user such as a business owner, but also to a user who can include a customer of the user. This can help reduce the number of status checks users of the asset management engine 118 receive from their customers by redirecting these inquiries to the asset management engine 118 instead. Because other third party access scenarios and/or user interfaces are contemplated, it should be understood that this embodiment is illustrative, and should not be construed as being limiting in any way.

Additionally, the asset management engine 118 can be configured to track billing and/or charging for the asset management service 120. Several billing/charging models are contemplated and others are possible. In some embodiments, the asset management service 120 can bill users a flat fee per day, week, month, year, or the like. In some other embodiments, the asset management service 120 can track users, records 126, status updates, asset tag creation, and/or other information and bill users based upon use. It should be understood that these embodiments are illustrative, and should not be construed as being limiting in any way.

Figure 5A:
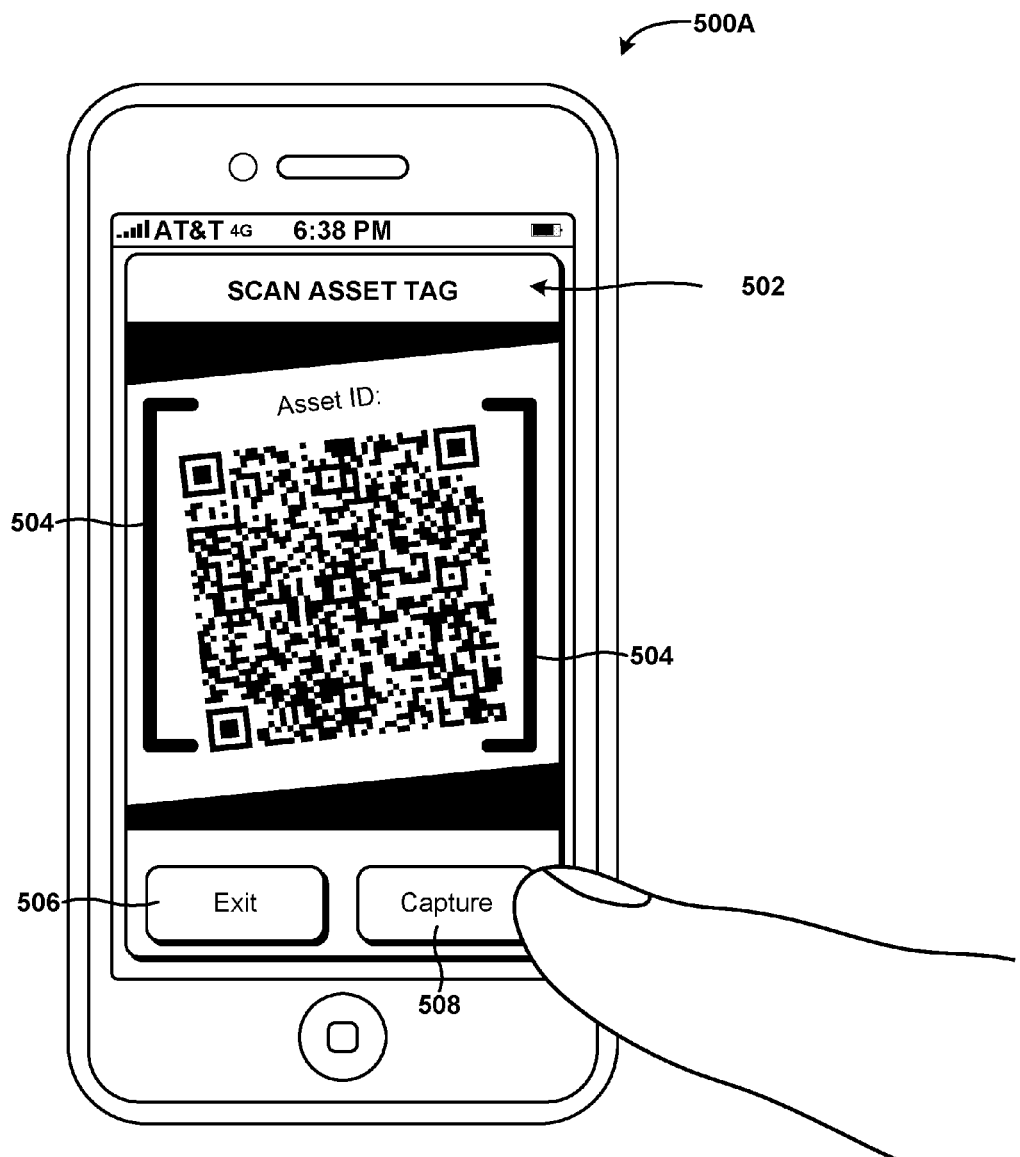
FIGS. 5A-5C are user interface ("UI") diagrams showing aspects of UIs for providing an asset management service, according to some illustrative embodiments.
Figure 5B:
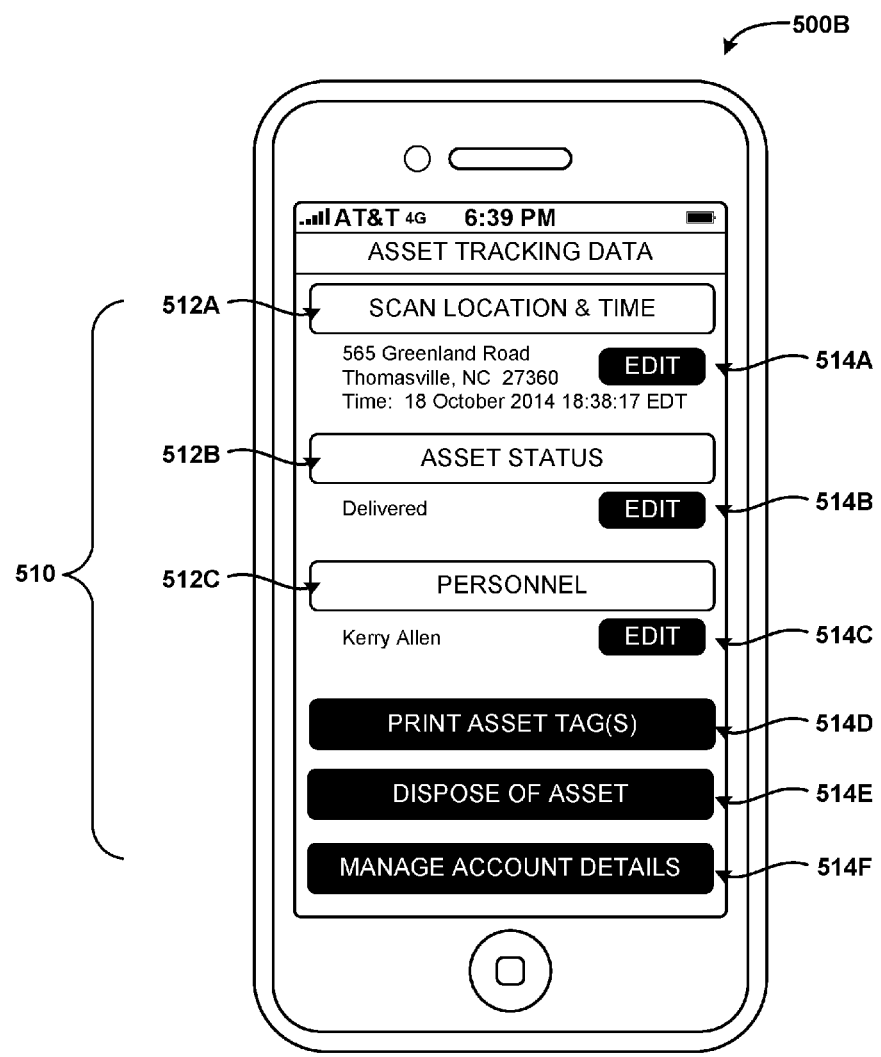
Figure 5C:
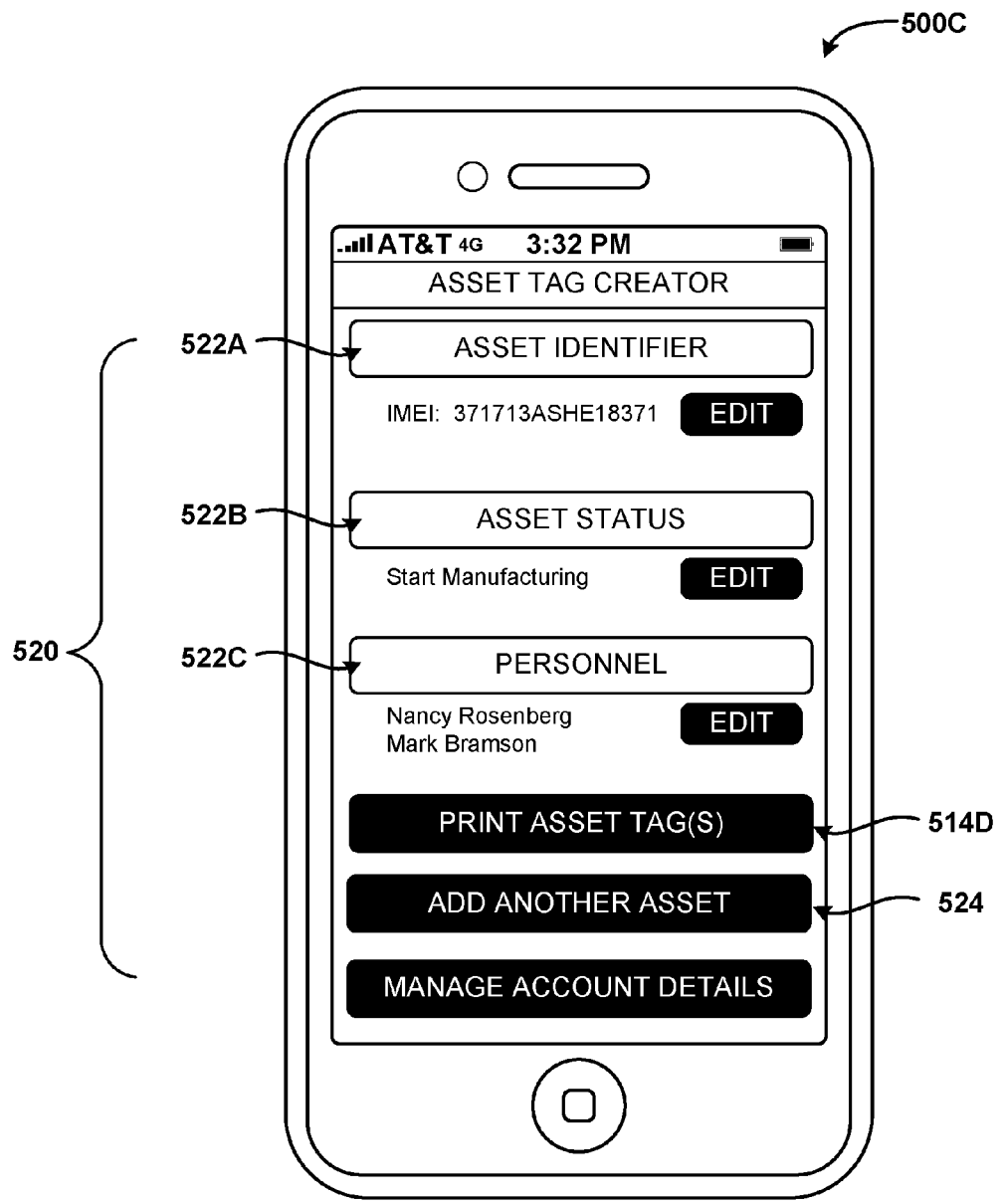

Turning now to FIGS. 5A-5C, UI diagrams showing various aspects of the concepts and technologies disclosed herein for an asset management service for distributed computing environments will be described according to various illustrative embodiments. FIG. 5A shows an illustrative screen display 500A generated by a device such as the user device 102. According to various embodiments, the user device 102 can generate the screen display 500A and/or other screen displays in conjunction with and/or based upon data received from the asset management application 108 and/or the asset management service 120 described herein. As noted above, the functionality associated with the asset management service 120 can be provided by a device remote from the user device 102 such as, for example, the asset management engine 118. Similarly, the functionality associated with the asset management application 108 can be provided by an application program executing at the user device 102 and/or by applications executing remotely from the user device 102. It should be appreciated that the UI diagram illustrated in FIG. 5A is illustrative of one contemplated embodiment, and therefore should not be construed as being limited in any way.

Although not shown in FIG. 5A, the screen display 500A can include various menus and/or menu options such as options for advancing to a next screen, returning to a previous screen, exiting registration of the user device 102, and/or other options. While the example embodiment of the screen display 500A illustrated in FIG. 5A is illustrated as being presented during a device registration or setup operation, it should be understood that the screen display 500A and/or other screen displays can be provided at almost any time during operation of the user device 102. Because the screen display 500A can be displayed at other times, it should be understood that this embodiment is illustrative, and should not be construed as being limiting in any way.

In FIG. 5A, the user device 102 is illustrated as displaying a user interface for capturing or scanning an asset tag or asset identifier 112 as described herein. As shown in FIG. 5A, the asset management application 108 can access an imaging device of the user device 102 and display data captured with the imaging device on a screen display for a user or other entity. Thus, the user device 102 can be configured to guide a user through an asset identifier capture process and/or other operations for capturing an asset identifier 112 or other information identifying an asset 114. As explained above in detail, it should be understood that near field communications, infrared, RFID, and/or other communications technologies can be used to capture the asset identifier 112 instead of, or in addition to, using an image capture device as illustrated in FIG. 5A.

It can be appreciated from the description of FIG. 3 above that the screen display 500A illustrated in FIG. 5A can be, but is not necessarily, used to guide a user through capturing or obtaining an asset identifier 112 as described with reference to operation 302 of the method 300 illustrated in FIG. 3. Because asset identifiers 112 can be captured or obtained at other times, it should be understood that this embodiment is illustrative, and should not be construed as being limiting in any way. The screen display 500A can include an asset identifier capture screen 502. The asset identifier capture screen 502 can include text, graphics, and/or other information that explains or guides a user or other entity through capturing an asset identifier 112.

As shown in FIG. 5A, though not necessarily included in all embodiments, the asset identifier capture screen 502 includes visual guides 504 for guiding a user or other entity to locate the user device 102 in or at an orientation and/or position at which a tag, label, or other surface bearing indicia of the asset identifier 112 can be captured or scanned. The screen display 500A also can include a UI control 506 for exiting capturing of the asset identifier 112. The screen display 500A also can include a UI control 508 for scanning or capturing the asset identifier 112 from visual information captured by the user device 102.

Thus, a user or other entity can, by way of interacting with the asset identifier capture screen 502, exit or complete capturing or scanning of the asset identifier 112 described herein. More particularly, selection of the UI control 506 can cause the user device 102 to close or exit the asset management application 108 and/or to cancel capturing or scanning of a tag or label that includes indicia of the asset identifier 112. Similarly, selection of the UI control 508 can cause the user device 102 to capture an image or other information from which the asset identifier 112 can be extracted or captured, thereby obtaining the asset identifier 112 as described herein. Because additional or alternative UI controls can be included in the screen display 500A, and/or because additional or alternative actions can be taken in response to selection of the UI controls 506, 508 included in the screen display 500A, it should be understood that these embodiments are illustrative, and should not be construed as being limiting in any way.

Referring now to FIG. 5B, a UI diagram showing additional aspects of the concepts and technologies disclosed herein for an asset management service for distributed computing environments are described in detail. In particular, FIG. 5B shows a screen display 500B generated by a device such as the user device 102. In some embodiments, the screen display 500B can be generated by the user device 102 in response to detecting a tap, touch, gesture, keystroke, voice command, or other input for creating asset identifiers 112; viewing, modifying, and/or submitting asset status updates; updating user accounts and/or permissions; accessing and/or modifying one or more settings, preferences, or configurations associated with the asset management application 108 and/or application programs that include or access the asset management application 108; printing tags, labels, and/or other indicia including information identifying the asset identifiers 112; or the like. Because the screen display 500B can be presented at other times, it should be understood that these embodiments are illustrative, and should not be construed as being limiting in any way.

The screen display 500B can include an asset tracking display for viewing scanned or captured asset identifier information; viewing current asset status; viewing personnel and/or organization information; modifying and/or entering user or organization credentials or permissions; printing asset tags, labels, and/or other indicia of asset identifiers 112; managing account details; disposing of assets 114 and/or terminating tracking of asset information; combinations thereof, or the like. The asset tracking display can include, for example, an asset/account information list 510. The asset/account information list 510 can include a number of rows 512A-C (hereinafter collectively and/or generically referred to as "rows 512"). The rows 512 can correspond to various types and/or categories of information that can be obtained or captured by the user device 102 during a scan or capture process as described herein. Because the asset/account information list 510 can include additional and/or alternative information, it should be understood that the illustrated embodiment is illustrative, and should not be construed as being limiting in any way.

The asset/account information list 510 also can include UI controls 514A-F (hereinafter collectively and/or generically referred to as "UI controls 514") for taking various actions with respect to data and/or other information obtained by, generated by, and/or detected by the asset management application 108. The rows 512 and UI controls 514 shown in FIG. 5B illustrate only some contemplated examples of data, information, actions, or the like that can be obtained, used, or taken by the user device 102 and therefore should not be construed as being limiting in any way.

The UI control 514A, for example, can be used to edit or recapture geographic location information captured by the user device 102. Thus, selection of the UI control 514A can cause the user device 102 to capture or recapture geographic location information and/or to allow a user or other entity to manually edit the information. The UI control 514B can be used to edit or change an asset status as described herein, particularly with respect to FIG. 4. Selection of the UI control 514B can cause the user device 102 to obtain and/or display available statuses or allow a user or other entity to manually enter a current status, if desired.

The UI control 514C can be used to edit or change personnel information. Thus, selection of the UI control 514C can cause the user device 102 to capture or change personnel information and/or to allow a user or other entity to manually edit the personnel information. The UI control 514D can be used to print asset tags, labels, and/or other indicia. The indicia can include data representing the asset identifiers 112 described herein. According to one contemplated embodiment, selection of the UI control 514D can cause the user device 102 to send data representing the tab, label, or other indicia to a local or remote printer such as, for example, a wirelessly-accessed printer for printing the indicia.

The UI control 514E can be used to indicate that an asset 114 has been disposed of, delivered, sold, traded, and/or the like. Thus, selection of the UI control 514E can cause the user device 102 to send data to the asset management engine 118 indicating that the tracking and/or servicing of a record 126 corresponding to the asset 114 is to be suspected or terminated. The UI control 514F can be used to access, view, and/or manage account details associated with an organization, user, device, credentials, or the like. As such, selection of the UI control 514F can cause the user device 102 to send data to the asset management service 118 requesting account information and/or navigation to an account management page or other location for accessing the account information.

According to various embodiments, the screen display 500B can be presented in response to a user or other entity capturing or scanning indicia that include a representation of the asset identifier 112 described herein. As such, it should be understood that the screen display 500B can be presented at almost any time. As explained above, application programs executed at the user device 102 can be configured to access one or more APIs associated with the asset management engine 118, if desired. As such, the asset/account information list 510 illustrated in FIG. 5B can include any number of rows 512 and/or UI controls in addition to, or instead of, the depicted information. As such, it should be understood that this embodiment is illustrative, and should not be construed as being limiting in any way.

Turning now to FIG. 5C, a UI diagram showing additional aspects of the concepts and technologies disclosed herein for an asset management service for distributed computing environments are described in detail. In particular, FIG. 5C shows a screen display 500C generated by a device such as the user device 102. In some embodiments, the screen display 500C can be generated by the user device 102 in response to detecting a tap, touch, gesture, keystroke, voice command, or other input for creating asset identifiers 112, though this is not necessarily the case. Because the screen display 500C can be presented at other times, it should be understood that these embodiments are illustrative, and should not be construed as being limiting in any way.

The screen display 500C can include an asset tag creation display for creating new asset tags, labels, or other indicia for representing an asset identifier 112 and/or for creating a new record 126 associated with the asset identifier 112 at the user device 102 and/or at the asset management engine 118 or asset management service 120. Thus, the asset tag creation display can include fields and/or UI controls for generating an asset identifier 112; viewing or assigning an initial asset status; adding, viewing, modifying, and/or assigning personnel and/or organization information associated with the asset identifier 112; printing asset tags, labels, and/or other indicia of the new asset identifier 112; adding additional assets 114 and/or asset identifiers 112; managing account details; combinations thereof, or the like.

The asset tag creation display can include, for example, an asset tag creation list 520 for presenting and/or allowing input of information for a new asset 114 and/or asset identifier 112. The asset tag creation list 520 can include a number of areas, regions, or other blocks of information ("blocks") 522A-C (hereinafter collectively and/or generically referred to as "blocks 522"). The blocks 522 can correspond to various types and/or categories of information that can be entered or defined by a user or other entity for a new asset 114 or asset identifier 112. Because the asset tag creation list 520 can include additional and/or alternative information, it should be understood that the illustrated embodiment is illustrative, and should not be construed as being limiting in any way.

The asset tag creation list 520 also can include UI controls 514 as described above with regard to FIG. 5B. The asset tag creation list 520 also can include a UI control 524 for adding an additional asset 114 or asset identifier 112. Thus, a user or other entity can create an asset identifier 112 or record 126 associated with a new asset 114, and then select the UI control 524 to create another new asset identifier 112 and/or record 126. As such, it can be appreciated that some embodiments of the screen display 500C can support rapid and convenient creation of asset identifiers 112 and/or records 126 associated with new assets 114. Similarly, as explained above, selection of the UI control 514D can cause the user device 102 to print or request printing of asset tags, labels, and/or other indicia that represent the asset identifier 112. As such, a user or other entity can create asset identifiers 112 and print tags, labels, or other indicia for representing the asset identifiers 112. The blocks 522 and UI controls 514, 524 shown in FIG. 5C illustrate only some contemplated examples of data, information, actions, or the like that can be obtained, used, or taken by the user device 102 and therefore should not be construed as being limiting in any way.

According to various embodiments, the screen display 500C can be presented in response to a user or other entity indicating that a new asset 114 or asset identifier 112 is to be created. As shown in the block 522B, the user or other entity has indicated the asset status as "start manufacturing," indicating that manufacturing of the asset 114 has begun. As can be appreciated from the above description, the status of the asset 114 can be stored at the asset data repository 122 and updated subsequently in response to scanning or capturing the asset identifier 112 associated with the asset, for example via presentation or interaction with the screen displays 500A, 500B described above.

In one example embodiment of the concepts and technologies disclosed herein, the asset management service 120 can be used to track ordinary objects in addition to, or instead of, the assets 114 described herein. Thus, for example, a business may wish to track buying behaviors of a customer with respect to products of the business. The business can generate an asset identifier 112 and include information identifying the asset identifier 112 in a tag, label, or other indicia to be included on the product sold by the business. The customer can scan the tag or other indicia using, for example, a downloaded, installed, and/or web-based application. When the indicia is scanned by the customer, the asset identifier 112 or other object identification such as a product ID or the like can be captured along with other information such as, for example, time information, location information, customer information (which can be defined as a registered customer or recorded using an IMEI, IMSI, and/or other device identifier), other information, combinations thereof, or the like. These and/or other information can be transmitted or made available to the business. The business can use the information for various purposes such as registering a customer, providing loyalty points, providing coupons, requesting reviews or comments, providing gifts, tracking or maintaining consumer behaviors and consumption patterns, other reasons, combinations thereof, or the like. It should be understood that these embodiments are illustrative, and should not be construed as being limiting in any way.

Figure 6:
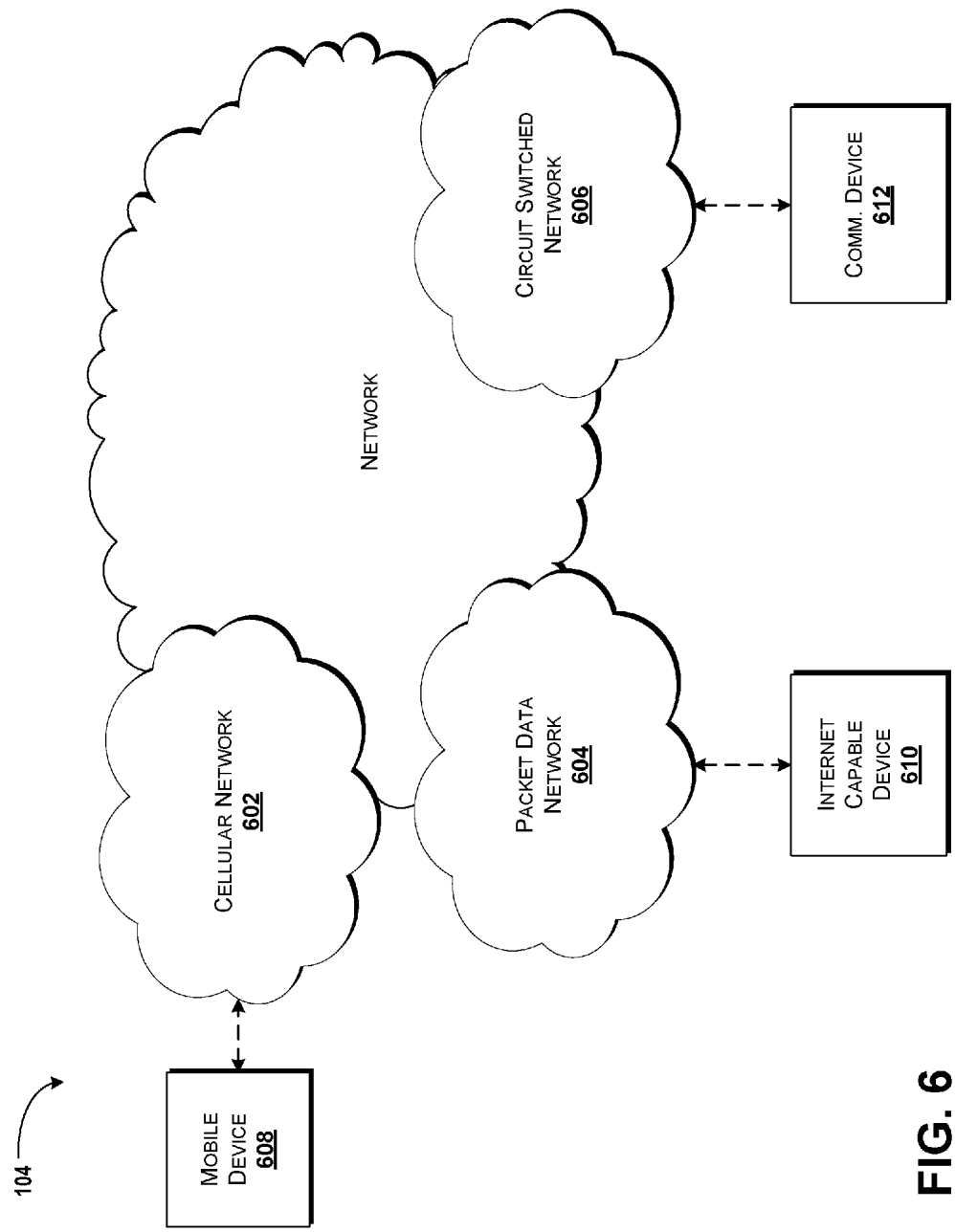
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
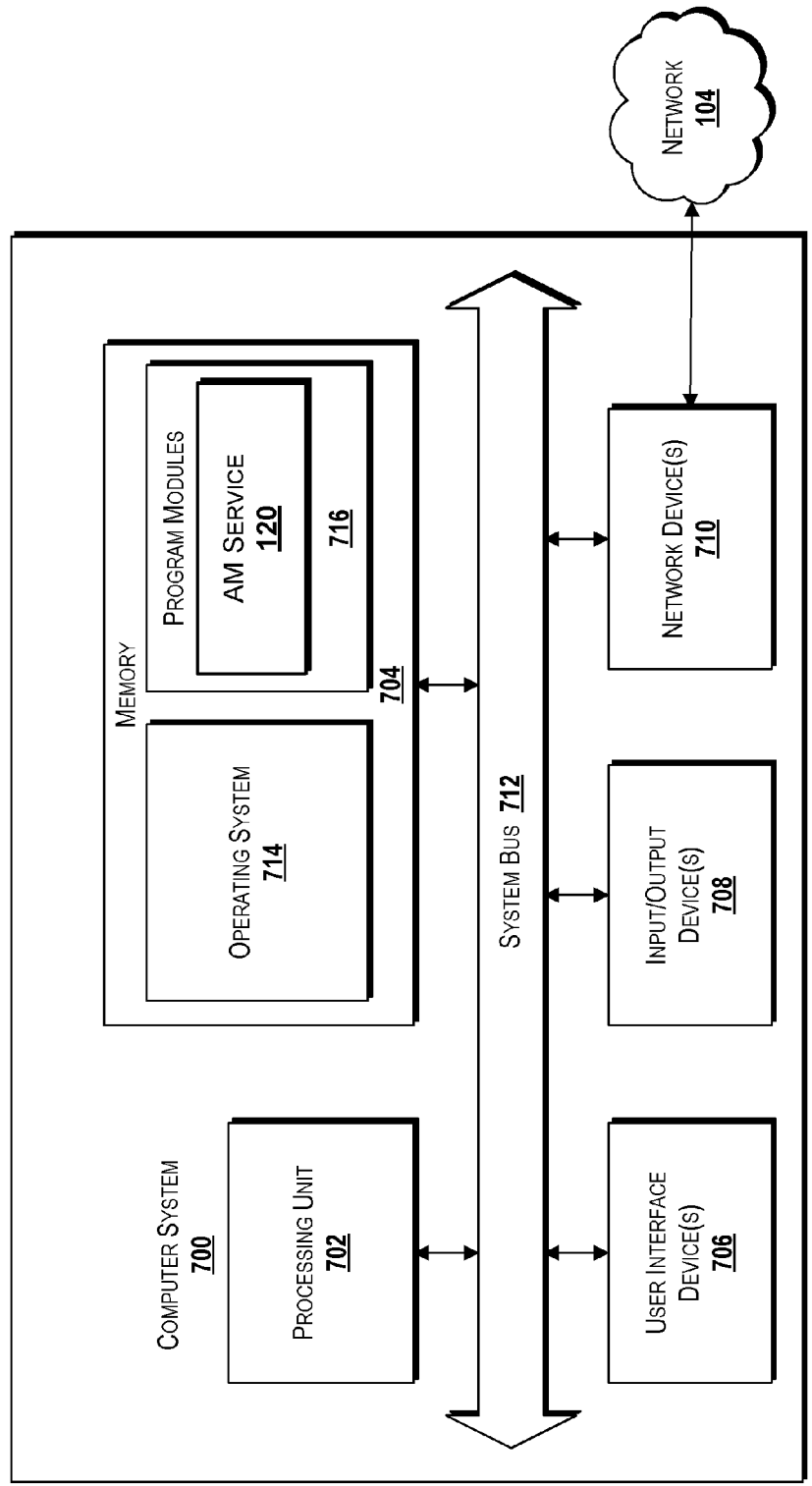
FIG. 7 is a block diagram illustrating an example computer system configured to provide an asset management service, according to some illustrative embodiments.

FIG. 7 is a block diagram illustrating a computer system 700 configured to provide the functionality described herein for an asset management service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, LEOPARD, MOUNTAIN LION, and/or other families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the asset management service 120. This and/or other programs can be embodied in computer-readable media containing instructions that, when executed by the processing unit 702, perform one or more of the methods 200, 300 described in detail above with respect to FIGS. 2-3. According to embodiments, the program modules 716 may be embodied in hardware, software, firmware, or any combination thereof. Although not shown in FIG. 7, it should be understood that the memory 704 also can be configured to store the asset data repository 122, the records 126, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof, does not include waves, signals, and/or other transitory and/or intangible communication media, per se.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
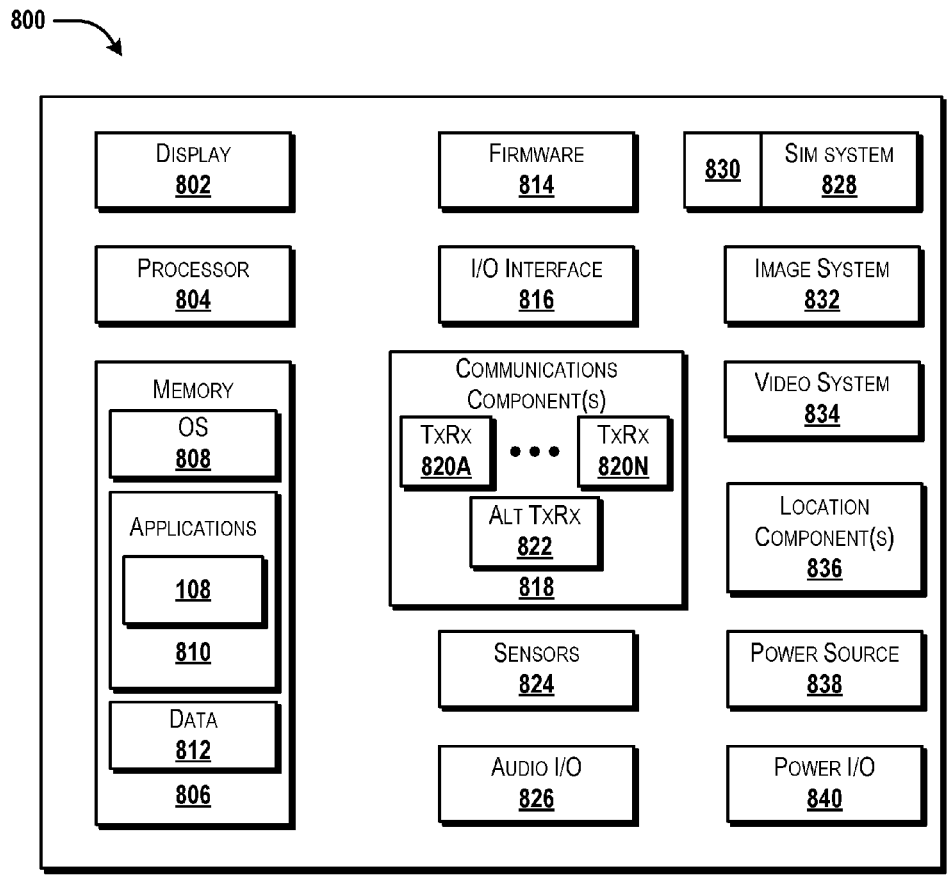
FIG. 8 is a block diagram illustrating an example mobile device configured to interact with an asset management service, according to some illustrative embodiments.

Turning now to FIG. 8, an illustrative mobile device 800 and components thereof will be described. In some embodiments, the user device 102 described above with reference to FIGS. 1-7 can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the asset management application 108, other computer-executable instructions stored in a memory 808, or the like. In some embodiments, the applications 806 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, asset information, asset tags and/or asset identifiers, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interfaced 816 can be configured to support the input/output of data such as location information, asset information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that an asset management service for distributed computing environments has been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
capturing, by a camera of a user device, an asset identifier that uniquely identifies an asset;
capturing, at the user device using a location device, geographic location information that identifies a geographic location of the user device;
transmitting, using a transceiver of the user device and directed to an asset management engine, the asset identifier and the geographic location information;
receiving, by the user device, a list of available status updates for the asset;
presenting, at the user device in a user interface, the list of available status updates;
detecting, at the user device, selection of a status update of the available status updates; and
transmitting, using the transceiver of the user device and directed to the asset management engine, the asset identifier, the geographic location information, and event data that indicates the status update.

2. The method of claim 1, wherein the asset identifier is obtained from information printed on an asset tag attached to the asset.

3. The method of claim 2, wherein the asset tag is generated at the user device.

4. The method of claim 3, wherein generating the asset tag comprises generating the asset identifier, obtaining asset information, and requesting printing of the asset tag.

5. The method of claim 4, wherein generating the asset tag further comprises transmitting the asset identifier and asset information to the asset management engine, wherein the asset management engine creates an asset record that corresponds to the asset.

6. The method of claim 2, wherein the asset tag comprises a two-dimensional barcode that represents the information.

7. The method of claim 2, wherein obtaining the asset identifier comprises:
presenting a further user interface via which the asset tag is scanned to extract the asset identifier;
capturing, using the camera, an image of the asset tag; and
extracting the asset identifier from the image.

8. The method of claim 1, further comprising:
capturing, at the user device, authentication information that identifies the user device; and
transmitting, by the user device and to the asset management engine, the authentication information.

9. The method of claim 1, wherein the asset identifier is obtained from a two-dimensional barcode printed on an asset tag attached to the asset, and wherein obtaining the asset identifier comprises:
capturing, using the camera, an image of the two-dimensional barcode; and
extracting, from the image of the two-dimensional barcode, the asset identifier.

10. The method of claim 1, wherein the asset management engine generates the list of available status updates based upon the asset identifier and the geographic location information.

11. A device comprising:
a processor;
a camera;
a location device;
a transceiver; and
a memory that stores computer-executable instructions that, when executed by the processor, cause the processor to perform operations comprising
capturing, by the camera, an asset identifier that uniquely identifies an asset,
capturing, using the location device, geographic location information that identifies a geographic location of the device,
transmitting, using the transceiver and directed to an asset management engine, the asset identifier and the geographic location information,
receiving a list of available status updates for the asset,
presenting, in a user interface, the list of available status updates,
detecting selection of a status update of the available status updates, and
transmitting, using the transceiver and directed to the asset management engine, the asset identifier, the geographic location information, and event data that indicates the status update.

12. The device of claim 11, wherein the transceiver comprises a cellular transceiver.

13. The device of claim 11, wherein the location device comprises a global positioning system device.

14. The device of claim 11, further comprising a printer that is configured to print an asset tag comprising indicia that represents the asset identifier.

15. The device of claim 11, wherein the asset identifier is obtained from a two-dimensional barcode printed on an asset tag attached to the asset, and wherein obtaining the asset identifier comprises:
capturing, using the camera, an image of the two-dimensional barcode; and
extracting, from the image of the two-dimensional barcode, the asset identifier.

16. The device of claim 11, wherein the asset management engine is configured to generate the list of available status updates based upon the asset identifier and the geographic location information.

17. A computer storage medium having computer-executable instructions stored thereon that, when executed by a processor, cause the processor to perform operations comprising:
capturing, by a camera, an asset identifier that uniquely identifies an asset;
capturing, using a location device, geographic location information that identifies a geographic location of a user device;
transmitting, using a transceiver and directed to an asset management engine, the asset identifier and the geographic location information;
receiving a list of available status updates for the asset;
presenting, in a user interface, the list of available status updates;
detecting selection of a status update of the available status updates; and
transmitting, using the transceiver and directed to the asset management engine, the asset identifier, the geographic location information, and event data that indicates the status update.

18. The computer storage medium of claim 17, wherein the asset identifier is obtained from a two-dimensional barcode printed on an asset tag attached to the asset, and wherein obtaining the asset identifier comprises:
capturing, using the camera, an image of the two-dimensional barcode; and
extracting, from the image of the two-dimensional barcode, the asset identifier.

19. The computer storage medium of claim 18, wherein obtaining the asset identifier further comprises presenting a further user interface via which the asset tag is scanned to extract the asset identifier.

20. The computer storage medium of claim 17, wherein the asset management engine generates the list of available status updates based upon the asset identifier and the geographic location information.

* * * * *